United States Patent
Sabia et al.

(10) Patent No.: US 6,950,235 B2
(45) Date of Patent: *Sep. 27, 2005

(54) OPTICAL ISOLATORS AND METHODS OF MANUFACTURE

(75) Inventors: Robert Sabia, Corning, NY (US); Candace J. Quinn, Corning, NY (US); Larry G. Mann, Painted Post, NY (US)

(73) Assignee: Corning Incorporated, Corning, NY (US)

(*) Notice: Subject to any disclaimer, the term of this patent is extended or adjusted under 35 U.S.C. 154(b) by 88 days.

This patent is subject to a terminal disclaimer.

(21) Appl. No.: 10/255,730

(22) Filed: Sep. 25, 2002

(65) Prior Publication Data

US 2003/0206347 A1 Nov. 6, 2003

Related U.S. Application Data

(63) Continuation-in-part of application No. 10/139,664, filed on May 2, 2002, now Pat. No. 6,791,748.

(51) Int. Cl.⁷ .............................. G02B 27/28; G02F 1/09
(52) U.S. Cl. ...................... 359/484; 359/494; 359/497; 372/703
(58) Field of Search ............................... 359/280, 484, 359/494, 497; 372/703

(56) References Cited

U.S. PATENT DOCUMENTS

| | | | |
|---|---|---|---|
| 4,186,999 A | 2/1980 | Harwood et al. | 350/96.21 |
| 4,407,667 A | 10/1983 | LeNoane et al. | 65/3.11 |
| 4,479,819 A | 10/1984 | Borelli et al. | 65/30.11 |
| 4,530,452 A | 7/1985 | Balyasny et al. | 225/96 |
| 4,626,068 A | 12/1986 | Caldwell | 350/96.24 |
| 4,960,331 A | * 10/1990 | Goldman et al. | 356/467 |
| 5,183,710 A | 2/1993 | Gerbino | 428/405 |
| 5,319,483 A | * 6/1994 | Krasinski et al. | 398/41 |
| 5,346,583 A | 9/1994 | Basavanhally | 156/629 |

(Continued)

FOREIGN PATENT DOCUMENTS

| | | | |
|---|---|---|---|
| DE | 197 31 075 | 1/1999 | C03C/29/00 |
| DE | 19731075 | 1/1999 | C03C/29/00 |
| EP | 1 057 793 A1 | 12/2000 | C03B/37/027 |
| JP | 03-115178 | 5/1991 | C04B/37/00 |
| JP | 08146351 | 6/1996 | G02B/27/28 |
| JP | 08-146351 | 6/1996 | G02B/27/28 |
| JP | P2000-56265 A | 2/2000 | G02B/27/28 |
| JP | 52[1977]-78454 | 3/2000 | G02F/1/09 |
| JP | 2002321947 | 11/2002 | C03C/27/00 |
| WO | WO01/98225 | 12/2001 | C03C/27/06 |

OTHER PUBLICATIONS

"Process for Bonding Workpieces of Metal, Semimetal and Compounds Thereof", English–language translation of DE 19731075A1, Schreiber Translations, Inc.*

(Continued)

Primary Examiner—John Juba, Jr.
(74) Attorney, Agent, or Firm—Siwen Chen; Timothy M. Schaeberle

(57) ABSTRACT

Optical isolators and methods of manufacturing optical isolators are disclosed. The optical isolators are manufactured by directly bonding the parts of the isolators without the use of adhesive or mechanical devices to hold the individual parts together.

16 Claims, 3 Drawing Sheets

U.S. PATENT DOCUMENTS

| | | | | |
|---|---|---|---|---|
| 5,441,803 A | * | 8/1995 | Meissner | 428/220 |
| 5,451,547 A | | 9/1995 | Himi et al. | 437/225 |
| 5,452,122 A | | 9/1995 | Tsuneda et al. | 359/281 |
| 5,579,421 A | | 11/1996 | Duvall et al. | 385/14 |
| 5,631,986 A | | 5/1997 | Frey et al. | 385/78 |
| 5,689,519 A | * | 11/1997 | Fermann et al. | 372/18 |
| 5,785,874 A | | 7/1998 | Eda | 216/24 |
| 5,846,638 A | | 12/1998 | Meissner | 428/220 |
| 5,852,622 A | | 12/1998 | Meissner et al. | 372/39 |
| 5,915,193 A | | 6/1999 | Tong et al. | 438/455 |
| 5,932,048 A | | 8/1999 | Furukawa et al. | 156/153 |
| 5,989,372 A | | 11/1999 | Momoda et al. | 156/89.11 |
| 6,030,883 A | | 2/2000 | Nishimoto et al. | 438/455 |
| 6,048,103 A | * | 4/2000 | Furukata et al. | 385/73 |
| 6,098,429 A | | 8/2000 | Mazabraud et al. | 65/392 |
| 6,120,917 A | * | 9/2000 | Eda | 428/692 |
| 6,129,854 A | | 10/2000 | Ramsey et al. | 216/18 |
| 6,153,495 A | | 11/2000 | Kub et al. | 438/459 |
| 6,178,779 B1 | | 1/2001 | Drouart et al. | 65/391 |
| 6,249,619 B1 | | 6/2001 | Bergmann et al. | 385/11 |
| 6,275,336 B1 | | 8/2001 | Yoshikawa et al. | 359/484 |
| 6,359,733 B1 | | 3/2002 | Iwatsuka et al. | 359/500 |
| 6,429,144 B1 | | 8/2002 | Vines et al. | 438/745 |
| 6,548,176 B1 | * | 4/2003 | Gwo | 428/420 |
| 6,580,842 B1 | * | 6/2003 | Hehlen et al. | 385/11 |
| 6,583,029 B2 | | 6/2003 | Abe et al. | 438/455 |
| 6,600,601 B1 | * | 7/2003 | Ikari et al. | 359/484 |
| 6,621,630 B2 | * | 9/2003 | Iwatsuka | 359/484 |
| 2002/0005987 A1 | * | 1/2002 | Wills et al. | 359/497 |
| 2002/0108556 A1 | | 8/2002 | Ebbers | 117/2 |
| 2002/0186915 A1 | * | 12/2002 | Yu et al. | 385/11 |
| 2003/0079503 A1 | | 5/2003 | Cook et al. | 65/407 |
| 2003/0079823 A1 | | 5/2003 | Sabia | 156/99 |
| 2003/0081906 A1 | | 5/2003 | Filhaber et al. | 385/60 |
| 2003/0081930 A1 | * | 5/2003 | Filhaber et al. | 385/147 |
| 2003/0206345 A1 | | 11/2003 | Sabia et al. | 359/484 |

OTHER PUBLICATIONS

Onishi et al., "A novel temperature compensation method for SAW devices using direct bonding Techniques," *Ultrasonics Symp*, 1997, IEEE Proceedings, Oct, 5–8, 1997 pp. 227–230.

"Wafer Direct Bonding: Tailoring Adhesion Between Brittle Materials"; Materials Science and Engineering; R25 (1999)1–88, Plössl, et al.

Arthur Landrock; "Surface Preparation of Adherends"; Adhesives Technology Handbook; 1985; p. 117–118.

A. Sayah, D. Solignac, T.Cueni, "Development of novel low temperature bonding technologies for microchip chemical analysis applications", Sensors and Actuators, 84 (2000) pp. 103–108.

P. Rangsten, O. Vallin, K. Hermansson, Y. Backlund, "Quartz–to–Quartz Direct bonding", J. Electrochemical Society, V. 146, N.3, pp. 1104–1105, 1999).

H. Nakanishi, T. Nishimoto, M. Kani, T. Saitoh, R. Nakamura, T. Yoshida, S. Shoji, "Condition Optimization, Reliability Evaluation of $SiO_2$–$SiO_2$ HF Bonding and Its Application for UV Detection Micro Flow Cell", Sensors and Actuators, V. 83, pp. 136–141, 2000.

A. Yamada, et al. "Bonding Silicon wafer to Silicon Nitride with Spin–on Glass Adhesive", Electronics Letters, Mar. 26, 1987, vol. 23, No. 7.

D.J. Harrison, et al. "Micromachining a Miniaturized Capillary Electrophoresis–Based Chemical Analysis System on a Chip", Science 261 (1993) 895–897.

W.P. Maszara, "Silicon–on–insulator by Wafer Bonding: A Review", J. Electrochemical Society 138 (1991) 341–347.

D–W. Shin, et al., "The Stacking Faults and Their Strain Effect at the SI/$SiO_2$ Interfaces of a Directly Bonded SOI (Silicon on insulator)", Thin Solid Firms, V. 346, pp. 169–173, 1999.

Q–Y. Tong, et al "The Role of Surface Chemistry in Bonding of Standard Silicon Wafers", J. Electrochemical Society, V. 144, N.1, pp. 384–389, 1997.

* cited by examiner

OPTICAL ISOLATORS AND METHODS OF MANUFACTURE

The present application is a continuation-in-part application of U.S. patent application Ser. No. 10/139,664, filed by Robert Sabia et al., on May 2, 2002 entitled "OPTICAL ISOLATORS AND METHODS OF MANUFACTURE," now U.S. Pat. No. 6,791,748, the disclosure of which is incorporated herein by reference in its entirety. The present application thus claims the benefit of U.S. patent application Ser. No. 10/139,664 under 35 U.S.C. §120.

FIELD OF THE INVENTION

This invention relates to optical isolators and methods of manufacturing optical isolators. More particularly, the invention relates to direct bonding of the materials comprising optical isolators and methods of performing such direct bonding.

BACKGROUND OF THE INVENTION

Optical isolators are devices used in optical transmission systems to prevent back reflections in optical fibers. Back reflections can occur in fiber systems when light traveling in the system encounters an irregularity such as a change in refractive index between abutting materials or misalignment of fibers in the system. Back reflections result in reduced performance of the system and sometimes can adversely affect the transmission source, typically a laser.

Polarization dependent isolators utilize polarizers such as polarizing glass sheets to sandwich the Faraday rotator. In use, an isolator is disposed between two optical fibers or lenses such that light travels through a first polarizer, then through the Faraday rotator, and then through the second polarizer. In forward or pass mode operation, the incident light emitted from a light source such as a laser passes through the first polarizer. The remaining 50% of the light is then rotated 45° by the Faraday rotator before passing through a second polarizer offset from the first polarizer by 45°, preventing loss of signal. Polarized light emerges through the second polarizer. In reverse or blocking mode operation, reflected signal transmitted back through the isolator is polarized by the second polarizer before being rotated 45° by the direction independent Faraday rotator to a polarization mode 90° off from the first polarizer. Thus, no signal is transmitted back into the laser.

Another type of polarizer design utilizes a single polarizer, wherein in the pass mode, the emitted signal first passes through garnet and then through polarizer. The returned signal is polarized before passing through garnet, which rotates the return signal so that it is out of phase with emitted signal. This scheme promotes minimal laser interference. This design is less preferred than the isolator design described above which includes two polarizers, however, this single isolator design is less expensive than the dual polarizer isolator design.

Polarization independent isolators are preferred for applications where the incident signal is not already polarized. However, the emitted beam is not polarized. Polarization independent isolators include a Faraday rotator sandwiched between two beam splitters, which can be a birefringent material in wedge or plate form, or a prism with a thin film coating. In forward operation, incident light emitted from a laser is polarized by a first beam splitter into two distinct polarization modes. Each mode passes through a Faraday rotator and an optional half-wave plate, the latter correcting for the 45° rotation imparted by the Faraday rotator. The modes are then recombined by a second beam splitter into a non-polarized emission. In reverse or blocking mode operation, reflected light transmitted back through the isolator is separated into two distinct polarization modes by the second beam splitter. When each mode passes through the Faraday rotator and the optional half-wave plate, the signals are rotated 90° (due to the directional dependence of the half wave plate). When both rotated modes are recombined at the first beam splitter, the combined signal is transmitted 90° from the signal feed, thus preventing transmission (i.e., reflection) back into the laser.

Faraday rotators are typically made by surrounding a piece of garnet crystal with a magnet to apply magnetic field and make the crystal optically active. This type of garnet is referred to as non-latching. Another type of Faraday rotator utilizes a permanently magnetized or latching garnet that does not require an external magnet field.

The various component parts of both polarization dependent (Faraday rotator and polarizers) and polarization independent optical isolators (beam splitters and Faraday rotator) are typically held together by either mechanical assembly or by epoxy or polymeric adhesives. A limitation of mechanical assembly includes the introduction of optical signal loss due to air gaps that tend to exist between the surfaces of the adjacent parts, and the need to align and package individual components after dicing to final dimensions. An alternative method involves adhesive bulk assembly or lamination of large sheets of material followed by dicing, which avoids costs associated with packaging of individual, pre-diced parts. However, the adhesive assembly has the disadvantage of introducing optical loss when the epoxy or adhesive is in the optical path of the isolator. Another disadvantage of adhesive assembly is that when the isolator assembly encounters temperature variations, the epoxy or adhesive can fail due to CTE mismatches and/or temperature dependence of the adhesive's refractive index, causing delamination of the components. An additional disadvantage of adhesive assembly is that the epoxy may be susceptible to laser damage, causing optical loss, or, in some cases, catastrophic failure of the device in high power applications.

It would be desirable to provide an inexpensive and reliable method for bonding together the component parts of optical isolators. Furthermore, it would be desirable to achieve bonding of the isolator components without the use of adhesives or epoxy, while maintaining advantages of bulk assembly prior to dicing to final dimensions.

SUMMARY OF INVENTION

One embodiment of the invention relates to an optical isolator including a Faraday rotator bonded to at least one beam splitting element or polarizer, the bond being formed by an adhesive-free and epoxy-free chemical bond or vacuum bond at a temperature below the Curie temperature of the Faraday rotator. In preferred embodiments, the temperature is below about 200° C. In some embodiments, the bond includes a covalent bond and/or a hydrogen bond. In certain embodiments, the bond interface includes lithium, and preferably, lithium is included in either or both of the Faraday rotator, the beam splitter or the polarizer.

Certain embodiments of the invention relate to a polarization dependent isolator including a pair of polarizers sandwiching and bonded to a Faraday rotator by chemical or vacuum bonding. Other embodiments relate to a polarization independent isolator including a pair of beam splitting elements sandwiching and bonded to a Faraday rotator. The Faraday rotator may include either a latching or a non-latching garnet. The polarization independent isolator may further include a half-wave plate disposed between one of the beam splitters and the Faraday rotator, the half-wave plate being bonded to the Faraday rotator and the beam splitter by an adhesive-free and epoxy-free chemical or vacuum bond. According to certain embodiments, the Faraday rotator and the beam splitting element or polarizer include bonding surfaces coated with an antireflective coating, which may comprise silica.

Another embodiment of the invention relates to a method of manufacturing an optical isolator including forming an adhesive-free and epoxy-free chemical or vacuum bond between a Faraday rotator and a beam splitting element or polarizer. In certain embodiments, a Faraday rotator is sandwiched between, and bonded to, a pair of polarizers or beam splitting elements.

Chemical bonds can be formed between a Faraday rotator having a first bonding surface and a beam splitting element or polarizer having a second bonding surface by contacting at least one of the bonding surfaces with a solution to facilitate chemical bonding between the first and second bonding surfaces. Acidic solutions or solutions having a pH greater than 8 can be used. Hydroxide solutions such as ammonium hydroxide are examples of high pH solutions that may be used in accordance with this embodiment. Bonding may be facilitated by providing termination groups on at least one of the bonding surfaces selected from the group including —OH, $\equiv$Si—OH, $=$Si—$(OH)_2$, —Si—$(OH)_3$ and —O—Si—$(OH)_3$, and combinations thereof. In preferred embodiments, the majority of the termination groups includes $=$Si—$(OH)_2$, —Si—$(OH)_3$ and —O—Si—$(OH)_3$, and combinations thereof. Bonding may further be facilitated by including lithium on at least one of the bonding surfaces.

In certain embodiments, the method may include providing an antireflective coating on at least one of the bonding surfaces, and in preferred embodiments, the coating comprises silica. In other embodiments, bonding may involve providing adsorbed hydroxyl groups on at least one of the bonding surfaces. Thereafter, the adsorbed hydroxyl groups at the interface between the bonding surfaces can be eliminated, by for example, heating the bonding surfaces to a temperature less than the Curie temperature of the Faraday rotator.

The invention provides a simple, low temperature, and reliable bonding method that provides bond strength capable of surviving processing conditions, environmental testing and/or a lifetime of service. Bonding can occur at temperatures lower than the Curie temperature of the Faraday rotator, preferably below about 200° C., and in some cases lower than 100° C. Additional advantages of the invention will be set forth in the following detailed description. It is to be understood that both the foregoing general description and the following detailed description are exemplary and are intended to provide further explanation of the invention as claimed.

DETAILED DESCRIPTION

Figure 1A:
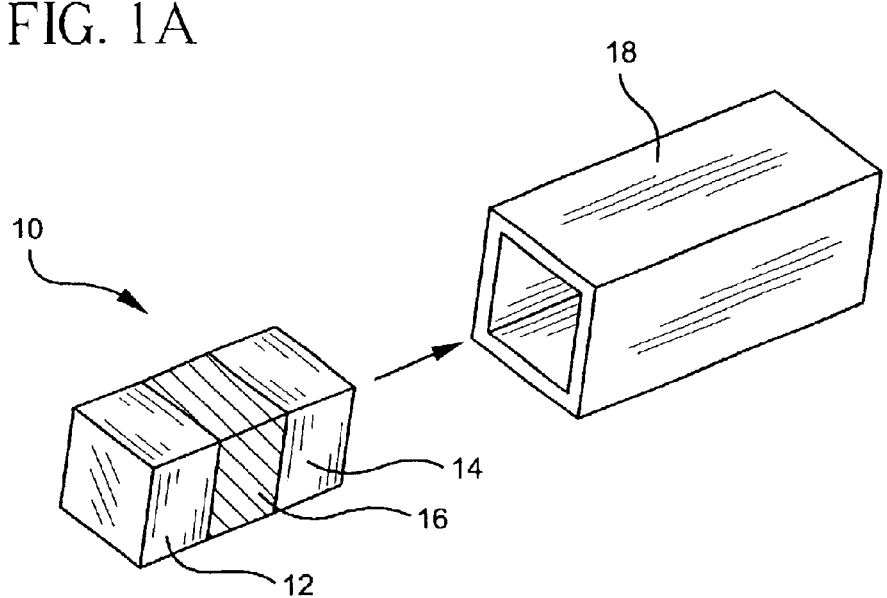
FIG. 1A is an exploded view of an optical isolator according to one embodiment of the invention.

Before describing several exemplary embodiments of the invention, it is to be understood that the invention is not limited to the details of construction or process steps set forth in the following description. The invention is capable of other embodiments and of being practiced or carried out in various ways.

According to the present invention, optical isolators are provided which can be manufactured by using various methods to directly bond opposing surfaces of the components that comprise both polarization dependent and polarization independent optical isolators. As used herein, the terms "direct bonding" and "direct bond" means that bonding between two surfaces is achieved at the atomic or molecular level, no additional material exists between the bonding surfaces such as adhesives or epoxy, and the surfaces are bonded without the assistance of fusion of the surfaces by heating. As used herein, the terms "fusion" or "fusion bonding" refers to processes that involve heating the bonding surfaces and/or the material adjacent the bonding surfaces to the softening or deformation temperature of the articles bonded. The methods of the present invention do not involve the use of adhesives, epoxies or fusion bonding to bond the opposing surfaces together. Instead, the present invention utilizes methods that involve forming a direct bond between the surfaces without high temperatures that soften the glass material to the point of deformation or can damage the Faraday rotator material. The present invention provides bonding methods that provide an impermeable, optically clear seal, resulting in essentially zero distortion of the light passing between the interface of the bonded surfaces. These bonding methods include chemical bonding and vacuum bonding. The formation of a direct bond between the isolator components allows for an impermeable seal that has the same inherent physical properties as the bulk material surfaces being bonded.

Vacuum bonding involves bringing two clean surfaces into contact in a high vacuum, thus forming a bond. Provided that the surfaces are flat and clean, a high vacuum removes adsorbed water and hydrocarbons from the surface while preventing the adsorption of such species. Surfaces can be processed and cleaned before being placed in the vacuum, or cleaned in the vacuum via ion milling or other plasma techniques.

Within the microelectronics field, vacuum bonding has been developed for sealing of such materials as single crystal silicon, thermal oxide $SiO_2$ grown on Si, and various metals, as described in U.S. Pat. No. 6,153,495, the entire content of which is incorporated herein by reference. Coefficient of thermal expansions (CTE) mismatch between materials is not an issue because the process can be applied at room temperature. Because polished wafers are thin and typically non-flat due to the Twyman effect, special fixturing can be used to apply pressure evenly across the entire wafer surface to generate appropriate contact.

Another type of bonding process that may be utilized according to the present invention involves chemical bonding. The formation of a chemical bond between two glass or metal surfaces allows for an impermeable seal that has the same inherent physical properties as the bulk material being bonded. In literature, low-temperature bonding technology has been reported for bonding soda-lime-silicate glass and for crystalline quartz (see, e.g., A. Sayah, D. Solignac, T. Cueni, "Development of novel low temperature bonding technologies for microchip chemical analysis applications," Sensors and Actuators, 84 (2000) pp. 103–108 and P. Rangsten, O. Vallin, K. Hermansson, Y. Backlund, "Quartz-to-Quartz Direct bonding," J. Electrochemical Society, V. 146, N. 3, pp. 1104–1105, 1999). Both the Sayah and Rangsten references, the entire contents of which are incorporated herein by reference, disclose using acid cleaning techniques. Another article, H. Nakanishi, T. Nishimoto, M. Kani, T. Saitoh, R. Nakamura, T. Yoshida, S. Shoji, "Condition Optimization, Reliability Evaluation of SiO2—SiO2 HF Bonding and Its Application for UV Detection Micro Flow Cell," Sensors and Actuators, V. 83, pp. 136–141, 2000, the entire content of which is incorporated herein by reference, discloses low-temperature bonding of fused $SiO_2$ by first contacting the bonding surfaces with hydrofluoric acid.

According to one embodiment of the invention, functional groups are provided on opposing surfaces of the isolator components to be bonded. No adhesives, high temperature pre-treatment or caustic hydrofluoric acid treatments are required prior to bonding the opposing surfaces. In one embodiment of the invention, a surface treatment of a high pH base solution such as sodium hydroxide, potassium hydroxide or ammonium hydroxide is utilized to provide functional groups on the bonding surfaces of the isolator components. In a preferred embodiment, the surfaces are first cleaned using a detergent followed by rinsing with an acid solution such as a nitric acid solution to remove particulate contamination and soluble heavy metals respectively.

According to one embodiment of the invention, the surfaces to be bonded are contacted with a high pH solution, rinsed, pressed into contact and gradually heated to the desired temperature, preferably to a temperature below the Curie temperature of the Faraday rotator material, which is typically known from the material specifications. It is preferable to use a "clean" heat source that does not introduce contaminants or byproducts to interfere with bonding. Such heat sources include, but are not limited to, induction heating, microwave heating, radio frequency (RF) heating and electric resistance heating. To enhance bonding, it is preferred that the surfaces are flat; surface conformity can be determined by performing a preliminary cleaning and pressing, into contact, of the dried surfaces, so as to observe the degree of interference fringes. Resulting interference fringes can be measured according to techniques known in the art and interpreted to determine matching flatness. Also, an optical flat or interferometer can be used to evaluate individual surface flatness.

Preferably, the bonding process of the present invention consists of machining each isolator surface to be sealed to an appropriate flatness. Particularly preferred flatness levels are less than about 1 micron and roughness levels of less than about 2.0 nm RMS. After polishing, each surface is preferably cleaned with an appropriate cleaning process such as first using a detergent, followed by soaking in a low pH acidic solution, and finally soaking in a high pH basic solution to generate a clean surface. In embodiments in which the isolator surfaces contain silicon, such cleaning and soaking will provide silicic acid-like, for example, $\equiv$Si—OH, $=$Si—$(OH)_2$, —Si—$(OH)_3$ and —O—Si—$(OH)_3$) terminated surface groups. Compared with bonding systems that utilize only a low pH treatment and rely on hydroxyl terminated surface groups, it is believed that the present invention provides more robust bonding between silicon-containing articles for several reasons. While not wishing to be bound by theory, it is believed that larger silicic acid-like termination groups allow bonding (both hydrogen and covalent) to occur between surface groups that extend further away from the surface. Larger surface terminated groups such as $=$Si—$(OH)_2$, —Si—$(OH)_3$, and —O—Si—$(OH)_3$ extend further from the surface than $\equiv$Si—OH, and these larger groups are more susceptible to steric movement which promotes better bonding between surfaces including these larger groups. Additionally, each surface can be considerably rougher and still generate bonding due to the length in which the $=$Si—$(OH)_2$, —Si—$(OH)_3$, and —O—Si—$(OH)_3$ termination groups extend from the surface.

In a preferred embodiment, the surfaces are assembled without drying. A low to moderate load (as low as 1 PSI) is then applied as the surfaces are heated to less than 200° C., for example, between 100–200° C. and preferably below 100° C. so that adsorbed water evaporates and silicic acid-like surface groups condense to form a covalently-bonded interface.

According to certain embodiments of the invention, as noted above, it is desirable to provide bonding surfaces that are flat. It is preferred to have surfaces finished to 5 micron flatness or better, and preferably 1 micron flatness or better, on the surfaces to be bonded.

Additional information on a preferred embodiment of chemically bonding glass surfaces may be found in copending U.S. patent application entitled, "Direct Bonding of Articles Containing Silicon," commonly assigned to the assignee of the present patent application and naming Robert Sabia as inventor, the entire contents of which are incorporated herein by reference. However, the present invention is not limited to the chemical bonding methods disclosed in the copending patent application, and other chemical bonding techniques and vacuum bonding can be utilized in accordance with the present invention provided they are compatible with the materials that make up the isolator components. In addition, bonding in certain embodiments of the present invention may be enhanced by including lithium on at least one of the bonding surfaces. Additional information on the incorporation of lithium in or on bonding surfaces may be found in copending and commonly assigned U.S. patent application entitled, "Direct Bonding Methods Using Lithium," and naming Robert Sabia, Larry Mann and Dennis Smith as inventors.

The various embodiments of the present invention relate to optical isolators and a method for manufacturing polarization dependent and independent isolators by sealing surfaces into contact without an air gap or the use of an adhesive. According to one embodiment, polarization dependent isolators cores (i.e., sandwich-type structures with the Faraday rotator in the middle) are manufactured by sealing a polarizer such as Polarcor™ glass to a Faraday rotator such as yttrium ion garnet (YIG) or bismuth iron garnet (BIG) to manufacture polarization dependent isolators. In other embodiments, isolator cores are provided that include a Faraday rotator bonded to single a polarizer or beam splitting element by chemical bonding.

Referring to FIG. 1A, a polarization dependent isolator core 10 is shown, which includes a pair of polarizers 12, 14 sandwiched to a Faraday rotator 16. The polarizers 12, 14 are bonded to the Faraday rotator by vacuum bonding or chemical bonding techniques as described above. If non-latching garnet material is used for the Faraday rotator, one way of biasing the material involves inserting the isolator core into a magnet 18 as shown in FIG. 1. Other known method of biasing the non-latching material may be used. If a latching garnet material is used for the Faraday rotator 16, magnet 18 is not required to bias the Faraday rotator 16.

Figure 1B:
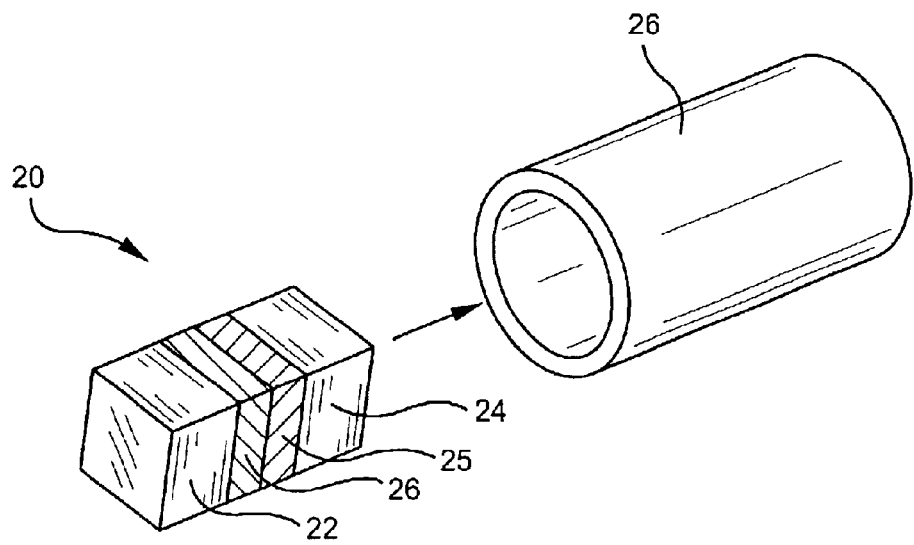
FIG. 1B is an exploded view of an optical isolator according to another embodiment of the invention.

In an alternative embodiment shown in FIG. 1B, polarization independent isolator cores 20 can be manufactured by sandwiching a Faraday rotator 26 between a pair of beam splitters 22, 24. Typically, the beam splitters 22, 24 comprise a birefringent material such as single crystal rutile or yttrium vandanate in the form of a plate or wedge, but other types of beam splitters may be used in accordance with the invention. Typically, polarization independent isolators also include a half wave plate 25 disposed between Faraday rotator 26 and beam splitter 24. The adjacent surfaces that make up the isolator core are bonded together using chemical or vacuum bonding techniques as described above. As in the previously described embodiment, if non-latching materials are used to form the Faraday rotator 26, the isolator core 20 is inserted in a magnet 28. However, if latching garnet is used to form the Faraday rotator, the magnet can be eliminated.

In an alternative embodiment of the optical isolator not shown), the optical isolator can include, bonded to the exposed end of the polarizers or beam splitters, an optical lens. It is contemplated that either one or both of the polarizers or beam splitters can include a bonded lens. As in the previously described embodiment, the adjacent surfaces of the polarizer or beam splitter and the lens are bonded together using chemical or vacuum bonding techniques as described above. The function of the lens bonded to the polarizer or beam splitter is to assist in collimating the signal through the optical isolator and or assist in focusing the signal that is emitted from the optical isolator. Preferably, the type of lens that can be utilized for this application includes, but is not limited to, gradient index (GRIN) lenses.

Figure 2:
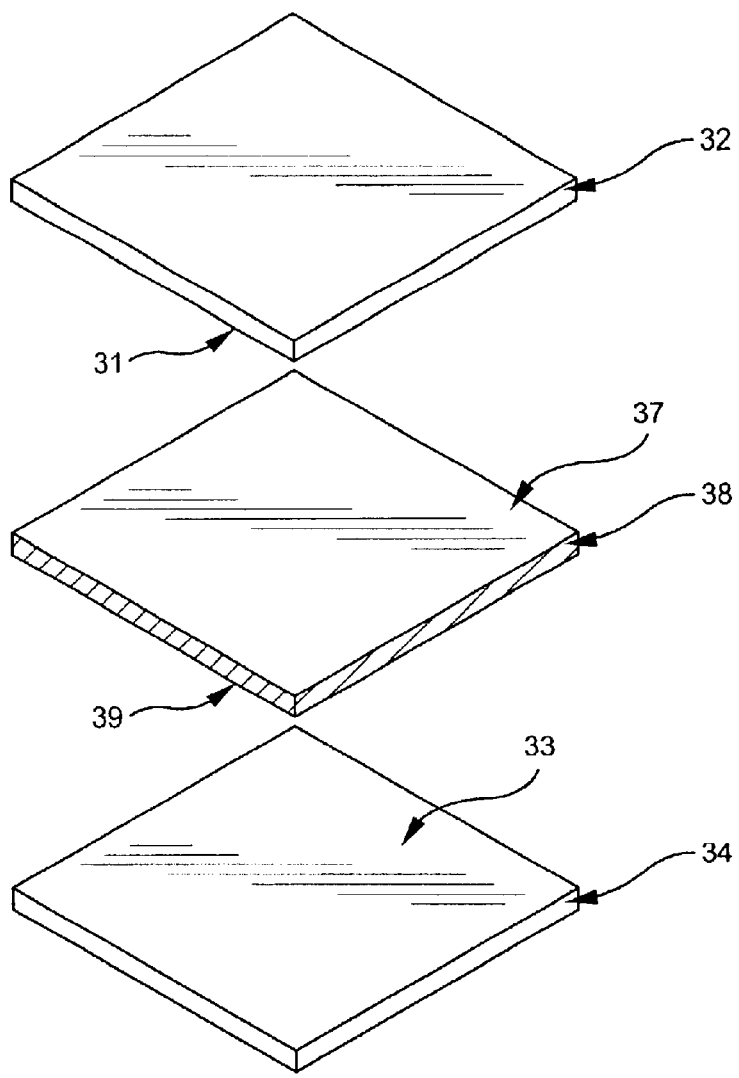
FIG. 2 is an exploded perspective view of layers of material for forming optical isolators according to one embodiment of the invention.
Figure 3:
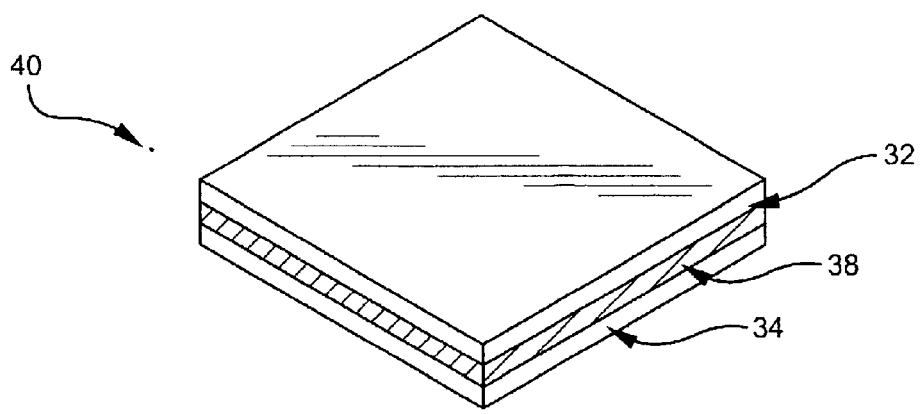
FIG. 3 is a perspective view of the layers of material in FIG. 2 bonded together.
Figure 4:
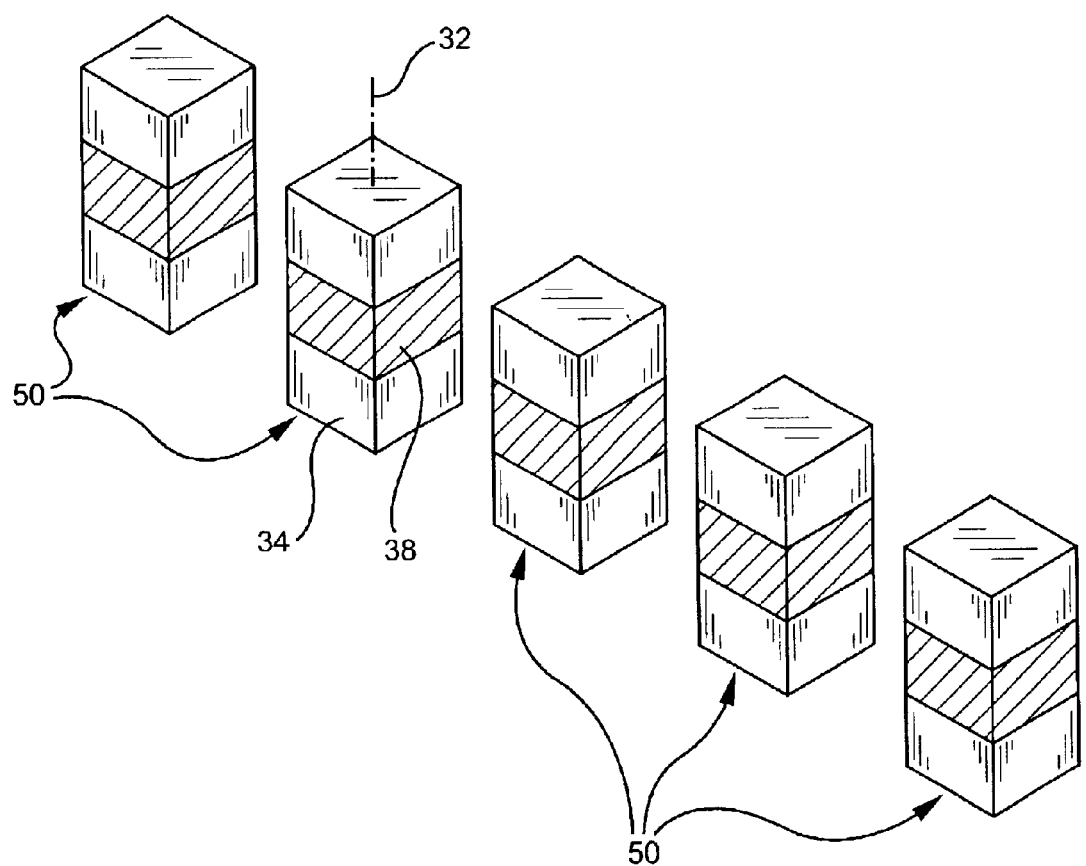
FIG. 4 is a perspective view of the layers of material shown in FIG. 3 after the layers have been diced into smaller sections.

FIGS. 2–4 show an example of a manufacturing process that can be used to produce isolators in accordance with various embodiments of the present invention. As shown in FIG. 2, sheets of material that are used to manufacture the individual layers of the optical isolator core are processed and polished to an appropriate flatness to enhance chemical or vacuum bonding. The bonding surfaces preferably should have a flatness of less than 1 micron. As shown in FIG. 2, a sheet of Faraday rotator material sheet 38 is sandwiched between pair of polarizer or beam splitter material sheets 32, 34. The Faraday rotator sheet 38 includes bonding surfaces 37, 39, that are polished to an appropriate flatness. Beam splitter or polarizer sheet 32 includes bonding surfaces 31, and 33. The bonding surfaces 31 and 33 are polished to an appropriate flatness. The bonding surfaces 31, 33, 37, 39 of each of the sheets are then cleaned and prepared for either vacuum or chemical bonding. If chemical bonding is used, a preferred cleaning solution for chemical bonding the sheets is ammonium hydroxide. The sheets 32, 38, 34 are then stacked so that bonding surfaces 31 and 37 are in contact and bonding surfaces 39 and 33 are in contact to form an isolator core sheet 40. The bonded sheets may be moderately heated to a temperature below the Curie temperature of the Faraday rotator material to enhance the bonding. After the sheets are bonded into a core sheet 40, the sheet may be diced into a plurality of isolator cores 50 as shown in FIG. 4, each of cores 50 comprised the sheet materials 32, 34, and 38. Thereafter, the isolator cores 50 can be processed according to techniques known in the art.

It will be understood that the sheets of material 32, 38 and 34 may be coated with antireflective coating, in which case, the outer layer of the antireflective coating on each sheet will comprise the bonding surface. Because of refractive index difference between the materials that comprise the isolator core materials (e.g., 1.510 for Polarcor™ and 2.35 for bismuth iron garnet), an antireflective (AR) coating in most cases must exist at the interface between the isolator components. Thus, in practice, bonding is actually performed between an AR coated surface of one component (either the rotator or beam splitter or rotator or polarizer), between two AR coated surfaces wherein all adjoining surfaces have an AR coating, or between two surfaces where one surface has a full (complete) AR coating and the second surface has a $SiO_2$ surface coating that does not by itself act to limit reflectance but rather assists in bonding. These sandwich structures can also be manufactured to produce multistage isolation by having multiple Faraday rotator layers, with specific application to high powered lasers.

Without intending to limit the invention in any manner, the present invention will be more fully described by the following examples.

EXAMPLE 1

This example demonstrates that Polarcor™ polarizing glass sheets available from Corning, Inc. can be bonded together and survive dicing without delamination of the sheets. Two Polarcor™ glass sheets previously polished to less than 1 micron flatness are coated with AR coating [$SiO_2$—$ZrO_2$—$SiO_2$] were pretreated with lithium metal by thermal evaporation under vacuum and heat treated at 200° C. for 24 hours. The sheets were cleaned with a detergent solution (Microclean $CA0_5$), rinsed in water and soaked in 10 volume % nitric acid solution for 1 hour. The acid-soaked samples were rinsed in water and then soaked in a 15 volume % ammonium hydroxide solution for 1 hour. The samples were rinsed again, and the bonding surfaces were maintained in a wet condition and bonded under about 10 pounds per square inch pressure and a bonding temperature of 75° C. for 24 hours. The bonded sheets were diced into 2 mm strips, and the sheets did not delaminate during the dicing operation.

EXAMPLE 2

This example demonstrates that isolator cores comprising Polarcor™ glass sheets sandwiched together with a Faraday rotator material sheet can be bonded together and diced into isolator cores without delamination. Two Polarcor™ glass sheets previously polished to less than 1 micron flatness and AR coated were pretreated by coating with lithium metal by thermal evaporation under vacuum and heat treated at 200° C. for 24 hours. The lithium coated Polarcor™ sheets along with a flat, AR-coated bismuth iron garnet (BIG, purchased from MGC) sheet were cleaned with a detergent solution (Microclean CA05), rinsed in water and soaked in 10 volume % nitric acid solution for 1 hour. The acid-soaked samples were rinsed in water and then soaked in a 15 volume % ammonium hydroxide solution for 1 hour. The samples were rinsed again, and the bonding surfaces were maintained in a wet condition, stacked so that the Polaror™ sheets sandwiched the Faraday rotator sheet, and bonded under about 10 pounds per square inch pressure and a bonding temperature of 115° C. for 24 hours. The bonded sheets were diced into 2 mm×2 mm core structures of the type shown in FIG. 4, and the sheets did not delaminate during the dicing operation.

The present invention is directed to isolator structures and sealing or bond processes that result in a chemical bond or vacuum bond without the use of an adhesive, epoxy or an air gap between applicable surfaces. The seal or bond can be achieved at temperatures at or below 100° C., thus making the process applicable for latched and unlatched garnets. As is known in the art, heating of garnet materials above their Curie temperatures should be avoided because the properties of the material are destroyed by heating above the Curie temperature. A seal or bond can be achieved for a multi-layered core structure where alternating layers of a polarizer and a Faraday rotator are assembled for high power laser applications (i.e., multistage isolation with 2,3,4, or more Faraday rotators in series with a polarizer for each rotator.

This sealing or bonding process of the present invention can be utilized for assembly of glass, crystalline, and anti-reflectance coated surfaces to each other. Isolators that have components (e.g., polarizers, rotators, half wave plates) independently mounted with air gaps require anti-reflectance (AR) coatings to prevent back reflection at each surface due to differences in refractive index between each material and air. Similar differences exist for bonded interfaces due to the difference in refractive index between the two materials. Thus, interfaces between such materials may require AR coatings. Typical AR coatings include a base-layer material used primarily for adhesion (example: $SiO_2$ for Ar coating of glass surfaces), followed by a material which differs significantly in refractive index from the part being coated (examples: $ZrO_2$, $Al_2O_3$, $Nb_2O_3$, etc.), and a $SiO_2$ outer layer. In preferred embodiments, an outer layer including silicon such as $SiO_2$ is preferred to facilitate bonding. In some embodiments, an anti-reflective coating is included on one of the bonding surfaces, and the other bonding surface, that forms a bond interface, includes a silicon-containing coating such as silica coating to facilitate bonding. Differences in CTE between the coatings and the coated material can result in a somewhat stressed AR coating. Accordingly, those of skill in the art will appreciate that coating designs including a number of alternating layers should account for refractive index differences for two materials and differences in CTE.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. An optical isolator comprising:
 a Faraday rotator bonded to at least one beam splitting element or polarizer to provide a bond interface, the bond being formed by an adhesive-free and epoxy-free chemical bond or vacuum bond including lithium at the bond interface, wherein both the Faraday rotator and the at least one beam splitting element or polarizer operate to provide optical isolating function, and the bonding surfaces contain silicon.

2. The optical isolator of claim 1, wherein the bond includes a covalent bond.

3. The isolator of claim 1, wherein the bond includes a hydrogen bond.

4. The isolator of claim 1, wherein the bond interface includes lithium in the surface of the Faraday rotator or the beam splitting element or the polarizer.

5. The isolator of claim 1, wherein the isolator is a polarization dependent isolator including a pair of polarizers sandwiched around and bonded to a Faraday rotator.

6. The isolator of claim 5, wherein the Faraday rotator includes a latching garnet.

7. The isolator of claim 5, wherein the Faraday rotator includes a non-latching garnet.

8. The isolator of claim 5, further including a lens disposed on an external surface of either one or both of the polarizers, the lenses being bonded to the polarizers by an adhesive-free and epoxy-free chemical or vacuum bond.

9. The isolator of claim 1, wherein the isolator is a polarization independent isolator including a pair of beam splitting elements sandwiched around and bonded to a Faraday rotator.

10. The isolator of claim 9, wherein the Faraday rotator includes a latching garnet.

11. The isolator of claim 9, wherein the Faraday rotator includes a non-latching garnet.

12. The isolator of claim 9, further including a half-wave plate disposed between one of the beam splitters and the Faraday rotator, the half-wave plate being bonded to the Faraday rotator and the beam splitter by an adhesive-free and epoxy-free chemical or vacuum bond.

13. The isolator of claim 9, further including a lens disposed on an external surface of either one or both of the beam splitters, the lenses being bonded to the beam splitters by an adhesive-free and epoxy-free chemical or vacuum bond.

14. The isolator of claim 1, wherein at least one of the Faraday rotator and the beam splitting element or polarizer include bonding surfaces coated with an antireflective coating.

15. The isolator of claim 14, wherein the anti-reflective coating includes multiple layers and the outer-most anti-reflective coating layer includes silicon.

16. The isolator of claim 15, wherein one of the bonding surfaces includes an anti-reflective coating and at least one of the boding surfaces includes a silicon-containing layer to assist with bonding of the surfaces.

* * * * *